United States Patent
Yoshida et al.

(10) Patent No.: US 7,259,679 B2
(45) Date of Patent: Aug. 21, 2007

(54) ELECTRONIC UNIT HAVING IDENTIFICATION INFORMATION THEREOF

(75) Inventors: Ichiro Yoshida, Takahama (JP); Hisashi Shigekusa, Okazaki (JP)

(73) Assignees: DENSO CORPORATION, Kariya (JP); DENSO WAVE CORPORATION, Tokyo (JP)

( * ) Notice: Subject to any disclaimer, the term of this patent is extended or adjusted under 35 U.S.C. 154(b) by 168 days.

(21) Appl. No.: 11/128,280

(22) Filed: May 13, 2005

(65) Prior Publication Data

US 2005/0253726 A1    Nov. 17, 2005

(30) Foreign Application Priority Data

May 14, 2004    (JP)    ............................. 2004-145175

(51) Int. Cl.
*G08B 13/14*    (2006.01)
(52) U.S. Cl. ................................ 340/572.8; 340/686.2; 340/686.1; 235/375
(58) Field of Classification Search .. 340/572.1–572.9, 340/686.2, 687, 686.1; 701/24–35; 235/375
See application file for complete search history.

(56) References Cited

U.S. PATENT DOCUMENTS

| | | | | |
|---|---|---|---|---|
| 5,689,242 | A * | 11/1997 | Sims et al. | 340/652 |
| 5,910,776 | A * | 6/1999 | Black | 340/10.1 |
| 5,952,922 | A * | 9/1999 | Shober | 340/572.4 |
| 5,995,006 | A | 11/1999 | Walsh | |
| 6,288,645 | B1 * | 9/2001 | McCall et al. | 340/568.2 |
| 6,784,802 | B1 * | 8/2004 | Stanescu | 340/687 |
| 6,847,856 | B1 * | 1/2005 | Bohannon | 700/115 |
| 2002/0125997 | A1 | 9/2002 | Kashi et al. | |
| 2004/0089717 | A1 | 5/2004 | Harari et al. | |
| 2006/0007003 | A1 * | 1/2006 | Yamagiwa | 340/572.1 |

FOREIGN PATENT DOCUMENTS

| | | |
|---|---|---|
| JP | A-09-503340 | 3/1997 |
| JP | 2000-357847 | 12/2000 |
| JP | 199 42 756 A1 | 9/2001 |
| KR | 10-2004-0007901 A | 1/2004 |
| WO | WO96/03787 | 2/1996 |
| WO | WO97/09641 | 3/1997 |
| WO | WO 01/80353 A1 | 10/2001 |

OTHER PUBLICATIONS

International Search Report from French Patent Office issued on Aug. 17, 2006 for the corresponding French patent application No. FR 0504872(a copy thereof).
Notice of Preliminary Rejection from Korean Patent Office issued on Jul. 27, 2006 for the corresponding Korean patent application No. 10-2005-0039909 (a copy and English translation thereof).

* cited by examiner

*Primary Examiner*—Jeffery Hofsass
*Assistant Examiner*—Hoi C. Lau
(74) *Attorney, Agent, or Firm*—Posz Law Group, PLC (57) ABSTRACT

The electronic unit having identification information thereon includes a casing, an electronic circuit contained in the casing, a connector fitted to the casing, the connector including signal terminals connected to the electronic circuit, and an RFID tag having an antenna device and attached to the connector. The RFID tag stores the identification information and is configured to transmit a reply signal containing the identification information through the antenna device in response to a transmission request signal transmitted from outside and received by the antenna device.

13 Claims, 7 Drawing Sheets

ELECTRONIC UNIT HAVING IDENTIFICATION INFORMATION THEREOF

CROSS-REFERENCE TO RELATED APPLICATION

This application is related to Japanese Patent Applications No. 2004-145175 filed on May 14, 2004, the contents of which are hereby incorporated by reference.

BACKGROUND OF THE INVENTION

1. Field of the Invention

The present invention relates to an electronic unit having identification information thereof, such as a vehicle mounted electronic control unit.

2. Description of Related Art

As proposed, for example, in published Japanese translation 9-503340 of PCT/US95/09032, there is known an electronic unit which has an ID tag attached to a connector thereof, and is automatically connected to a network to which an administration apparatus is connected when the connector is plugged into a receptacle. The administration apparatus monitors, through the network, the number and types of such electronic units whose connectors are plugged into receptacles. Accordingly, the administration apparatus can detect unauthorized removal or replacement of any of such electronic units.

It is also known to attach a tag containing ID information of a vehicle-mounted electronic unit to a connector of this vehicle-mounted electronic unit. This makes it possible to administrate various vehicle-mounted electronic units interconnected via an in-vehicle network.

However, the conventional vehicle component management system using such an in-vehicle network has a problem in that the ID information of a vehicle-mounted electronic unit cannot be read if its connector is not plugged into a corresponding receptacle. It is because, an ID reading device connected to the in-vehicle network cannot recognize a vehicle-mounted electronic unit until it is connected to this network by plugging its connector to a corresponding receptacle. This lowers the usability of the vehicle component management system.

Incidentally, it has been proposed to administrate vehicle components after they are shipped from factories at an administration center in order to prevent them from being stolen from a vehicle and sold away for use in other vehicles. This system makes it possible to confirm at a repair shop, for example, whether a vehicle component supposed to be mounted on a vehicle as a replacement or an additional component is an authentic one by reading the ID information from a tag attached to this component and sending it to the administration center.

However, also in such a system, to read the ID information from the tag, the connector of this vehicle component has to be plugged into a corresponding receptacle so that this vehicle component is connected to the network or to a test dedicated device. This lowers working efficiency in replacing or additionally installing the vehicle component at the repair shop.

SUMMARY OF THE INVENTION

The electronic unit having identification information thereof has a structure including:

a casing;

an electronic circuit contained in the casing;

a connector fitted to the casing, the connector including signal terminals connected to the electronic circuit; and an RFID tag having an antenna device and attached to the connector;

the RFID tag containing the identification information and configured to transmit a reply signal containing the identification information through the antenna device in response to a transmission request signal transmitted from outside and received by the antenna device.

With this structure, it becomes easy to administrate vehicle electronic units or components shipped from factories, because the ID information on any of the vehicle electronic units can be read through radio communication between the RFID tag attached to the connector of the vehicle electronic unit and an appropriate ID reading device without connecting the connector of the vehicle electronic unit to a corresponding external connector.

PREFERRED EMBODIMENTS OF THE INVENTION

Figure 1:
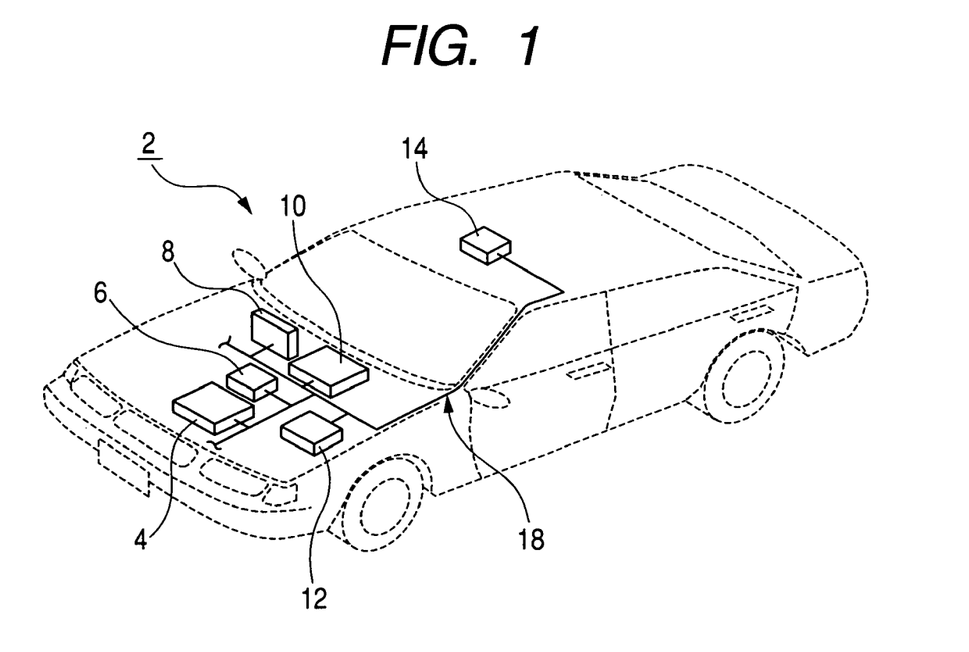
FIG. 1 is a diagram showing a structure of a control system of a vehicle, which includes various ECUs (Electronic Control Units) of the invention.

FIG. 1 shows a structure of a control system of a vehicle 2, this system including various ECUs (Electronic Control Units) interconnected through a communication wire 18.

As shown in this figure, this system includes an engine ECU 4 for controlling an engine of the vehicle 2, an air conditioner ECU 6 for controlling an air conditioner of the vehicle 2, a meter ECU 8 for controlling meters for indicating running and operating conditions of the vehicle 2, an audio ECU 10 for controlling audio devices installed in the vehicle 2, a security ECU 12 for controlling a monitor which operates while the vehicle 2 is parked and makes an alarm upon detecting an unauthorized manipulation of the vehicle 2 or unauthorized entrance into the vehicle 2, and a communication ECU 14 for controlling a communication device which operates to obtain various kinds of information from an administration center.

These ECUs constitute an in-vehicle LAN within which they can exchange data over the communication wire 18.

Explanation of the common structure of these ECUs is set forth below. In the following explanation, the ECUs 4, 6, 8, 10, 12, 14 are collectively called as an ECU 20.

Figure 2:
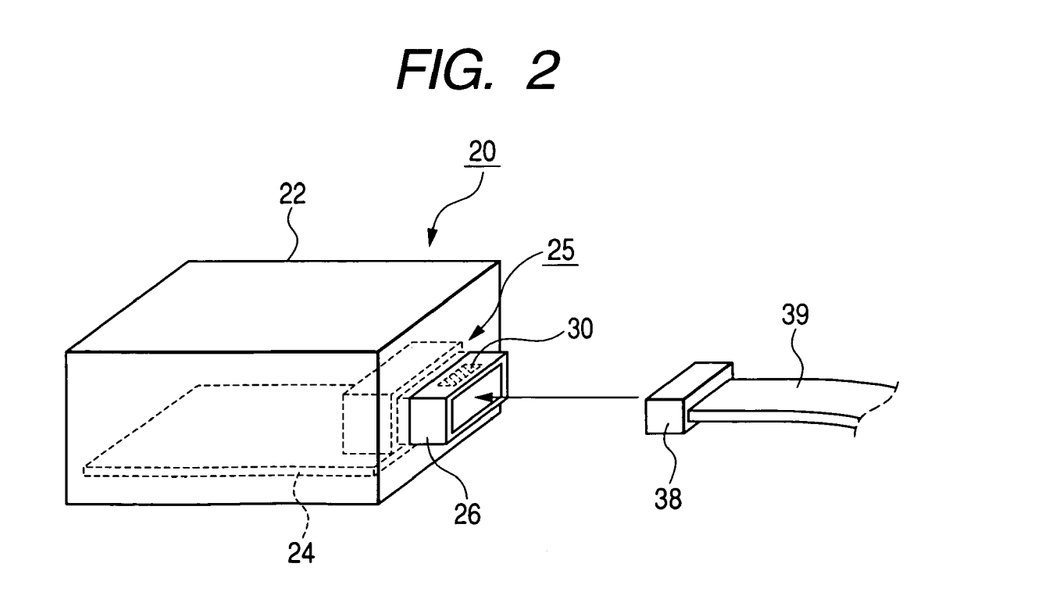
FIG. 2 to FIG. 4 are diagrams showing a structure of the ECU of the invention.

As shown in FIG. 2, the ECU 20 includes a casing 22 containing an electronic circuit board 24, a connector 25 fitted to the casing 20, an RFID (Radio Frequency IDentification) tag attached to the connector 25. Various electronic parts or circuit components 23 are mounted on the electronic circuit board 24 by soldering, for example AS shown in FIG. 3.

The connector 25, which is fixed to the electronic circuit board 24 by soldering, for example, is fitted into an opening formed in an outer wall of the casing 22 such that a mating portion 26 of the connector 25 projects from the outer wall of the casing 22. The electronic circuit board 24 is connected to various sensors, actuators, and a vehicle installed power source by way of the connector 25, an external connector 38 mated into the mating portion 26 of the connector 25 and a connection cable 38 including the communication wire 18, and a power wire connected between the external connector 38 and the vehicle installed power source.

The casing 22, which is made of metal plates (conductor) having capability of shielding the electronic circuit board 24 from external electromagnetism has a shape that totally encloses the electronic circuit board 24 except for the opening to which the connector 25 is fitted.

Figure 3:
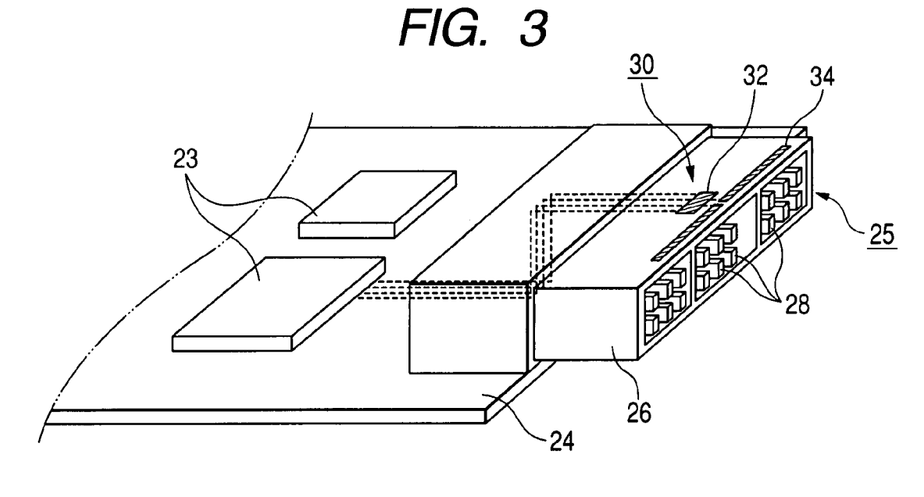

As shown in FIG. 3, the connector 25 has many signal terminals 28 for connection with the power wire, communication wire, and other signal wires leading to various sensors and actuators. These terminals 28, which are arranged in two rows within the mating portion 26 extend in a direction parallel to the surface of the electronic circuit board 24. These signal terminals 28 are protected from external mechanical shocks by the mating portion 26 that encloses them.

Figure 4:
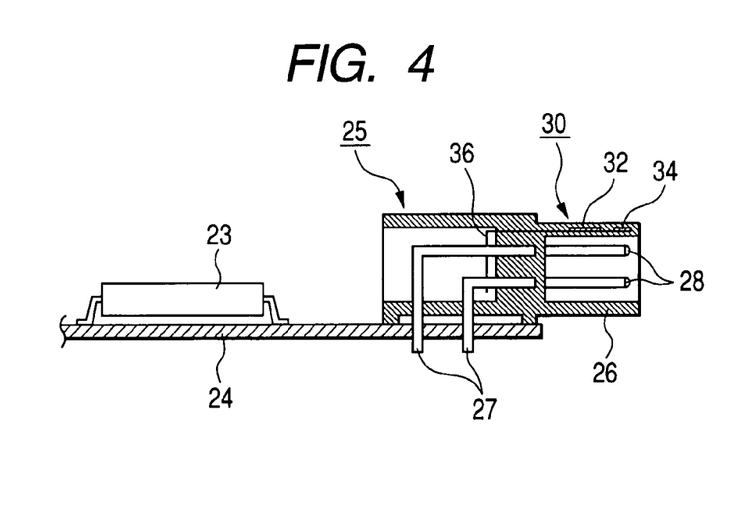

As shown in FIG. 4, the RFID tag 30 is embedded in an upper wall of the mating portion 26 housing the signal terminals 28, the upper wall being parallel to the surface of the electronic circuit board 24.

Figure 5:
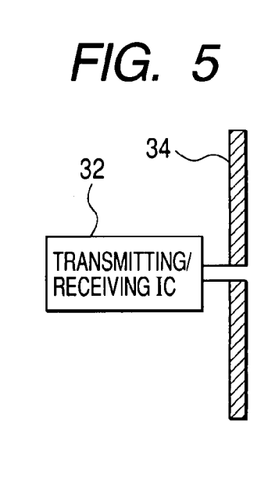
FIG. 5 is a diagram showing a structure of an antenna attached to the ECU of the invention.

As shown in FIG. 5, the RFID tag 30 includes a dipole antenna 34 having two straight antenna elements opposed to each other, and a transmitting/receiving IC 32 capable of performing radio communication with outside by use of the antenna 34. The straight antenna elements of the antennal 34 extend in a direction parallel to the front edge of the mating portion 26. The IC 32 is located in the rear of the antenna 34.

The body of the connector 25 including the mating portion 26 is made of an insulating synthetic resin. The signal terminals 28 and the RFID tag 30 are integrated into the connector 25 while the connector 25 is injection molded.

As shown in FIG. 4, the connector 25 further includes connection terminals 27 for connecting the electronic circuit board 24 to the IC 32 of the RFID tag 30. The IC 32 receives electricity for operation from the electronic circuit board 24 side through conductors 36 connected to the connection terminals 27.

Figure 6:
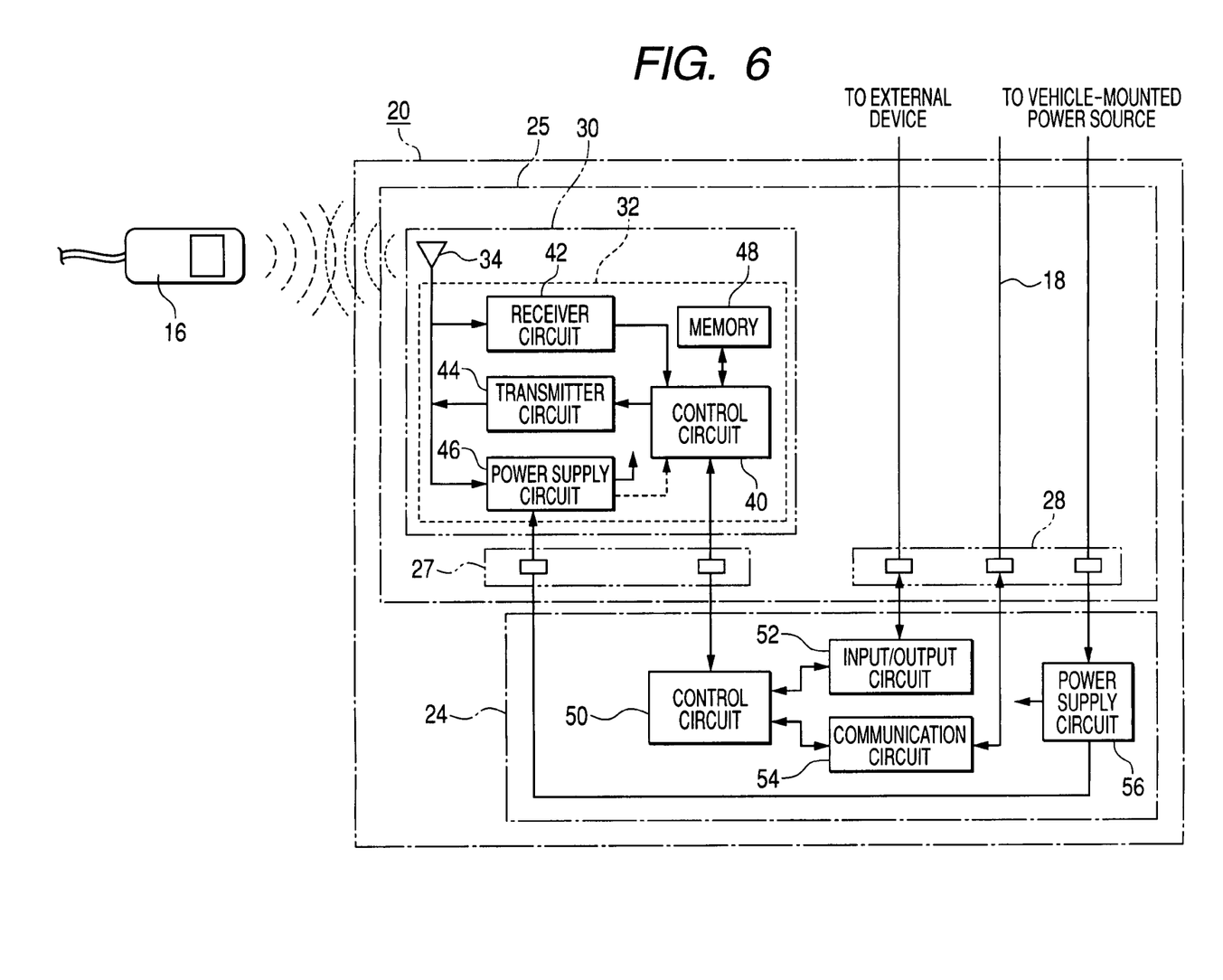
FIG. 6 is a block diagram showing a circuit structure of the ECU of the invention.

FIG. 6 is a block diagram showing a circuit structure of the ECU 20. As shown in this figure, the ECU 20 includes, on the electronic circuit board 24, a control circuit 50 constituted by a microcomputer having a CPU, a ROM and a RAM, an input/output circuit 52 performing signal transference between the control circuit 50 and external devices (sensors and actuators) through the signal wires, a communication circuit 54 performing data communication between the control circuit 50 of the ECU 20 and other ECUs through the communication wire 18, and a power supply circuit 56 receiving electricity from the vehicle installed power source (vehicle battery, for example) through the power line, and producing a power supply voltage for the circuit components of the ECU 20.

The IC 32 of the RFID tag 30 includes a control circuit 40 constituted by a microcomputer having a CPU, a ROM and a RAM, a receiver circuit 42 which demodulates a signal received through the antenna 34 and supplies it to the control circuit 40, a transmitter circuit 44 which modulates a carrier wave signal with a signal containing the ID information of the ECU 20 outputted from the control circuit 40, and transmits it through the antenna 34 in response to a request signal transmitted by an external device such as an RFID tag reader 16, a power supply circuit 46 which produces a power supply voltage for the circuit components of the IC 32 from the power supply voltage supplied from the electronic circuit board 24 side or by rectifying a received signal outputted from the antenna 34, and a ROM 48 storing the ID information of the ECU 20.

The control circuit 50 on the electronic circuit 24 side and the control circuit 40 of the RFID tag 30 can exchange data through the connection terminals 27.

Although the power supply circuit 46 of the RFID tag 30 can produce the power supply voltage for the circuit components of the IC 32 from the power received by the antenna 34, the power supply circuit 46 is configured to produce the power supply voltage from the electricity supplied from the power supply circuit 56 mounted on the electronic circuit board 24 when the power supply circuit 56 is operating to produce the power supply voltage or when the ignition switch is in the on state, and accordingly the ECU main body is operating.

Figure 7:
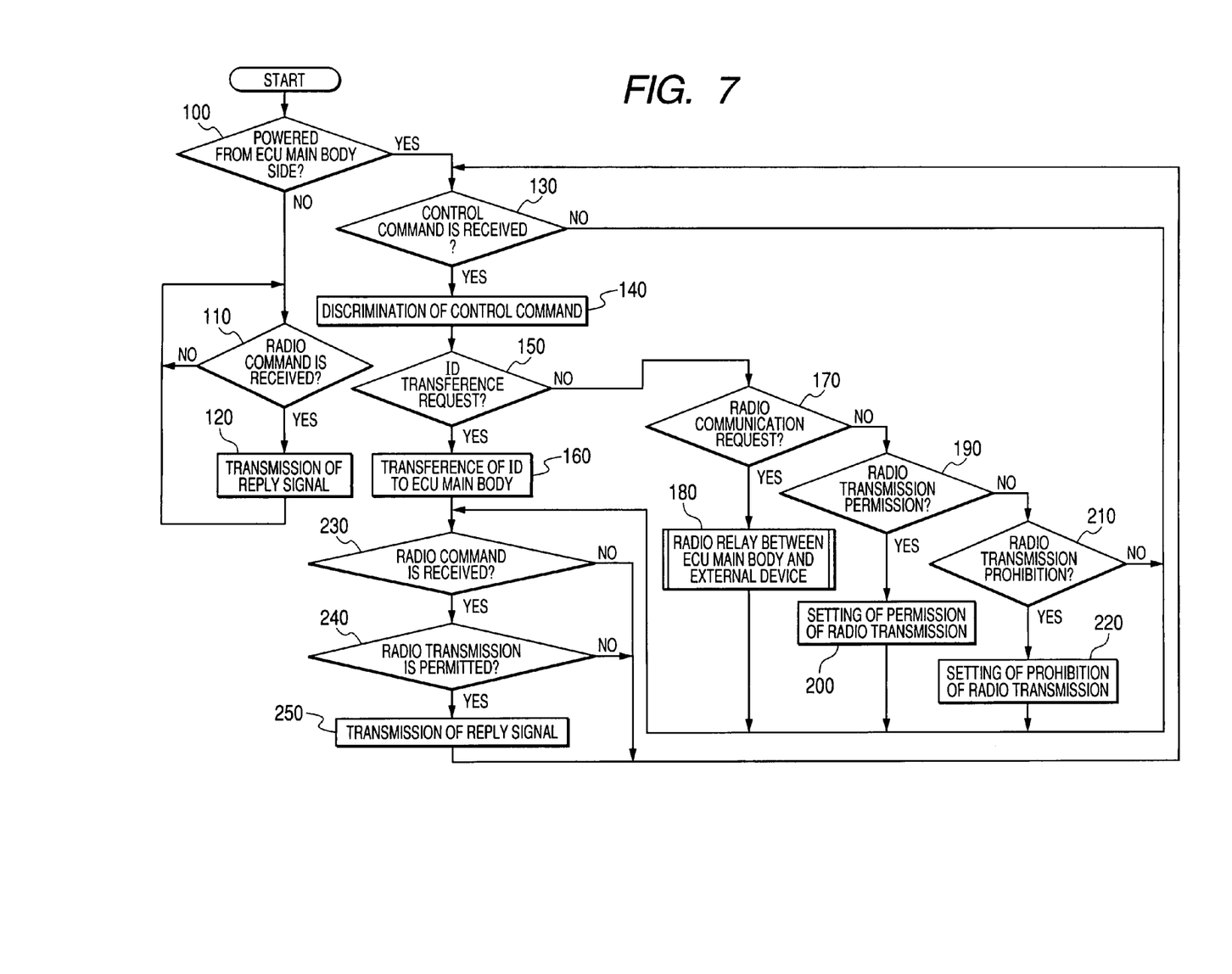
FIG. 7 is a flowchart for explaining the operation of the ECU of the invention.

Next, the operation of the RFID tag 30 is explained below with reference to the flowchart shown in FIG. 7.

The control circuit 40 of the RFID tag 30 checks, when powered by the power supply circuit 46, whether or not the power supply circuit 46 is being supplied with electricity from the electronic circuit board 24 side at step S100. If it is confirmed that the power supply circuit 46 is not being supplied with electricity from the electronic circuit board 24 side, then the process moves to step S110 where the receiver circuit 42 waits for a radio command such as an ID transmission request command transmitted from an external device, for example, from the RFID tag reader 16. If the radio command is received, then the process moves to step S120 where the ID information of the ECU 20 is read from the memory 48, added with information corresponding to the received radio command, and transmitted by the transmitter circuit 44 through the antenna 34.

As explained above, in this embodiment, it is possible to obtain information about the ECU 20 such as ID information when the ECU 20 is mounted on the vehicle 2 but not supplied with electricity from the vehicle installed power source, and also even when the ECU 20 is dismounted from the vehicle 2 by transmitting carrier waves to the RFID tag 30 as electric power for operation, and then transmitting the radio command such as the ID information transmission command.

While the ECU main body is not operating, the transmitter circuit 44 produces a response signal by modulating the nonmodulated carrier waves received through the antenna 34 with data supplied from the control circuit 40, and transmits it through the antenna 34.

On the other hand, if it is confirmed at step S100 that the power supply circuit 46 is being supplied with electricity from the electronic circuit board 24 side, then the process moves to step S130 where it is checked whether or not a control command which the control circuit 50 outputs in response to a notification request signal sent form outside through the signal terminals has been received by the RFID tag 30 through the connection terminals 27.

If it is confirmed that the control command has been received by the RFID tag 30, then the process moves to step S140 where it is checked which one of an ID transference request command, a radio communication request command, a radio transmission permission command and a radio transmission prohibition command the received control command is. Otherwise the process moves to step S230.

Subsequently, it is decided at step S150 whether or not the check result at step S140 shows that the received control command is the ID transference request command. If it shows that the received control command is the ID transference request command, then the process moves to step S160 to read the ID information of the ECU 20 from the memory 48 and transfers it to the control circuit 50. Thereafter the process moves to step S230.

If the check result at step S140 does not show that the received control command is the ID transference request command, then the process moves from step 150 to step S170 to decide whether or not the check result at step S140 shows that the received control command is the radio communication request command. If it shows that received control command is the radio communication request command, then the process moves to step S180 where the data being outputted from the control circuit 50 is forwarded to the transmitter circuit 44 so that it is transmitted through the antenna 34, and also the data being received by the receiver circuit 42 through the antenna 34 is forwarded to the control circuit 50. When this data relay operation by the RFID tag 30 is completed, the process moves to step S230.

If the check result at step S140 shows that the received control command is not the radio communication request command, then the process moves from step S170 to step S190 to decide whether or not the check result at step S140 shows that the received control command is the radio transmission permission command. If the check result at step S140 shows that the received control command is the radio transmission permission command, then the process moves from step S190 to step S200 to permit the transmission of the response signal in reply to the radio command received through the antenna 34. Thereafter the process moves to step S230.

If the check result at step S140 shows that the received control command is not the radio transmission permission command, then the process moves from step S190 to step S210 to decide whether or not the check result at step S140 shows that the received control command is the radio transmission prohibition command. If the check result at step S140 shows that the received command is the radio transmission prohibition command, then the process moves to step S220 to prohibit the transmission of the response signal in reply to the received radio command. Thereafter the process moves to step S230.

If it is decided at step S210 that the received control command is not the radio transmission prohibition command, that is, if it is decided at step S210 that the control command outputted from the control circuit 50 is not any one of the ID transference request command, radio communication request command, radio transmission permission command, and radio transmission prohibition command, the process moves to step S230.

At step S230, it is checked whether or not any radio command transmitted from an external device such as the RFID tag reader 16 has been received by the receiver circuit 42. If any radio command has been received by the receiver circuit 42, then the process moves to step S240 to check whether or not the radio transmission has been permitted by the operation at step S200. Otherwise, the process returns to step S130 to perform again the operations at and after step S130.

If it is confirmed at step S240 that the radio transmission has been permitted, then the process moves to step S250 where the ID information of the ECU 20 is read from the memory 48, added with information corresponding to the radio command received by the receiver circuit 42, and forwarded to the transmitter circuit 44 to be transmitted as the response signal through the antenna 34. Thereafter the process returns to the step S130 to perform again the operations at and after step S130.

If it is judged at step S240 that the radio transmission is not permitted, then the process returns to the step S130 to perform again the operations at or after step S130.

As explained above, the ECU 20 is so configured that when the control circuit 50 on the electronic circuit board 24 side sends a control command to the control circuit 40 of the RFID tag 30 while the RFID tag 30 is supplied with electricity from the electronic circuit board 24 side, the control circuit 40 operates in accordance with the control command. Accordingly, the control circuit 50 on the electronic circuit board 24 side can read the ID information from the memory 48, perform radio communication with the external device through the RFID tag 30, and also prohibit the RFID tag 30 from transmitting a response signal by sending the control command to the RFID tag 30.

With this embodiment, it becomes easy to administrate vehicle components (ECUs) shipped from factories, because the ID information of the ECU 20 can be read from the RFID tag 30 without connecting the connector of the ECU 20 to the external connector 38, and the main control circuit 50 of the ECU main body can use the RFID tag 30 for performing radio communication with outside.

Figure 8:
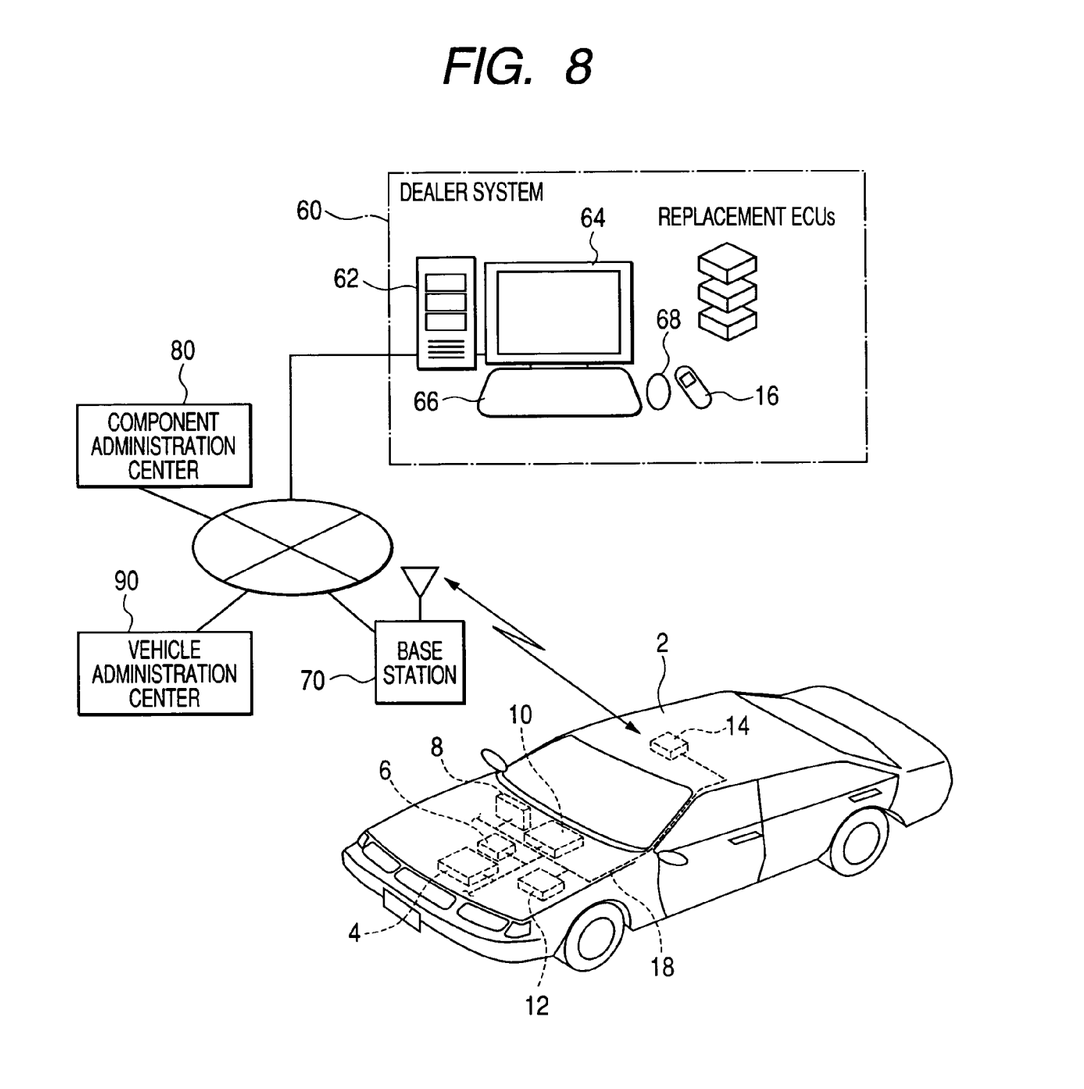
FIG. 8 is a diagram showing a structure of an ECU administration system for administrating the ECUs of the invention mounted on a vehicle.

FIG. 8 shows an example of an ECU administration system where information about the ECU 20 such as the ID of the ECU 20 and the shipment destination of the ECU 20 prestored in the RFID tag 30 attached to the ECU 20 is registered in a component administration center 80, and the ID of the ECU 20 is also registered in a vehicle administration center 90 at the time of shipping the vehicle 2 on which the ECU 20 is mounted.

With the above described embodiment, it is possible to improve the workability in accessing the component administration center 80 or vehicle administration center 90 for confirming whether or not a replacement ECU supposed to be mounted on the vehicle 2 is a one from proper channels and for updating historical data of the ECU dismounted from the vehicle 2 in an auto dealer, for example.

The ECU administration system shown in FIG. 8 is explained in more detail below.

The component administration center 80, which is accessible through a network such as the Internet, is for administrating a manufacture history, a use history, a theft history and the like for each ECU shipped from a factory. For example, when the component administration center 80 receives through the network an inquiry about the ID and histories of the ECU 20 originating from an information terminal (a personal computer, for example) of an dealer system 60 installed in an auto dealer, the component administration center 80 returns data on the histories of the ECU 20 extracted from a database after performing authentication of the inquirer.

The component administration center 80 updates the histories of the ECU 20 upon receiving a command that requires update of the histories of the ECU 20 together with the ID of the ECU 20 from the dealer system 60 or the communication ECU 14 mounted on the vehicle 2, after performing authentication of this access.

For example, in a case where the ECU 20 has been dismounted from the vehicle 2 in the auto dealer, the dealer system 60 notifies the component administration center 80 of this. As a response, the component administration center 80 updates the use history of the ECU 20 in accordance with the data on the used hours of the ECU 20 and the travel distance of the vehicle 2 sent from the dealer system 60, and also marks that the dismounted ECU 20 can be used for other vehicles.

In a case where the ECU 20 has been unjustly dismounted from the vehicle 2, or the ECU 20 has been stolen, the security ECU 12 notifies the component administration center 80 of this through the communication ECU 14. As a response, the component administration center 80 obtains the IDs of the vehicle 2 and the ECU 20 through the communication ECU 14, and marks that the ECU 20 has been stolen in the theft history.

The access of the vehicle 2 to the component administration center 80 is made through the communication ECU 14 mounted on the vehicle 2 and a base station 70 which can perform radio communication with the communication ECU 14.

The vehicle administration center 90, which is for administrating ECUs for each vehicle, monitors the ECU 20 mounted on the vehicle 2 through communication with the vehicle 2 or with the component administration center 80. The vehicle administration center 90 judges, when notified of any change in the ECU 20 from the vehicle 2 or the component administration center 80, whether this change is an authorized one or an unauthorized one.

The dealer system 60 includes the information terminal 62 such as a personal computer, a display device 64 connected to the information terminal 62, an input device such as a keyboard 66 and a mouse 68, and the RFID tag reader 16 for reading information about the ECU 20 mounted on or dismounted from the vehicle 2 such as the ID of the ECU 20 from the RFID tag 30 attached to the ECU 20, and inputting it to the information terminal 62.

When a mechanic checking on the vehicle 2 in a repair shop replaces the ECU 20 mounted on the vehicle 2, he can read the ID of a replacement ECU 20 by use of the RFID tag reader 16, and send it to the component administration center 80 through the information terminal 62 in order to authenticate the replacement ECU 20. If it has been confirmed that the replacement ECU 20 is an authenticated one, he updates the use history of the replacement ECU 20 by sending the ID of the vehicle 2 on which the replacement ECU 20 is supposed to be mounted to the component administration center 80 through the information terminal 62.

In addition, he reads the ID of the ECU 20 that has been dismounted from the vehicle 2 by use of the RFID tag reader 16 and sends it together with the ID of the vehicle 2 to the component administration center 80 through the information terminal 62 in order to notify the component administration center 80 of the removal of the ECU 20 from the vehicle 2, and update the use history of the ECU 20.

Since the IDs of the ECU 20 and the replacement ECU 20 can be easily read by radio communication between their RFID tags and the RFID tag reader 16, the labor for updating their use histories can be reduced.

Since the IDs stored in the RFID tags attached to various ECUs mounted on the vehicle 2 are identical with those registered in the component administration center 80 and the vehicle administration center 90, it is also possible to administrate the ECUs on the vehicle side by use of the security ECU 12 that can read IDs of other ECUs mounted on the vehicle 2 through their control circuits 50.

Figure 9:
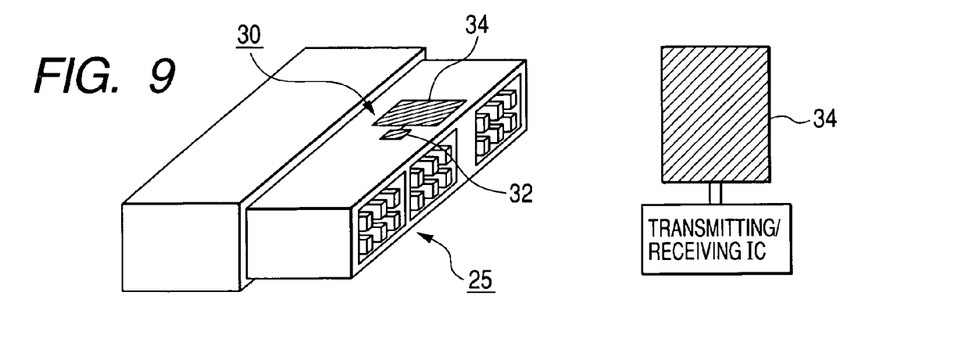
FIG. 9 to FIG. 12 are diagrams showing structures of antennas attached to the ECU of the invention.

Although the antenna 34 of the RFID tag 30 is a dipole antenna having two opposed antenna elements formed in the upper side wall of the mating portion 26 of the connector 25 so as to extend along the front edge of the mating portion 26, it may be a patch antenna as shown in FIG. 9 that has a rectangular patch formed in the upper side wall of the mating portion 26.

Figure 10:
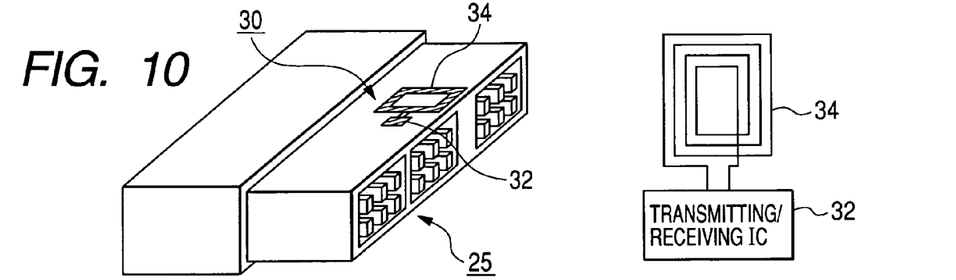

The antenna 34 may be also a coil antenna as shown in FIG. 10 that has a rectangular coil formed in the upper side wall of the mating portion 26 such that one of its sides is in parallel with the front edge of the mating portion 26.

Figure 11:
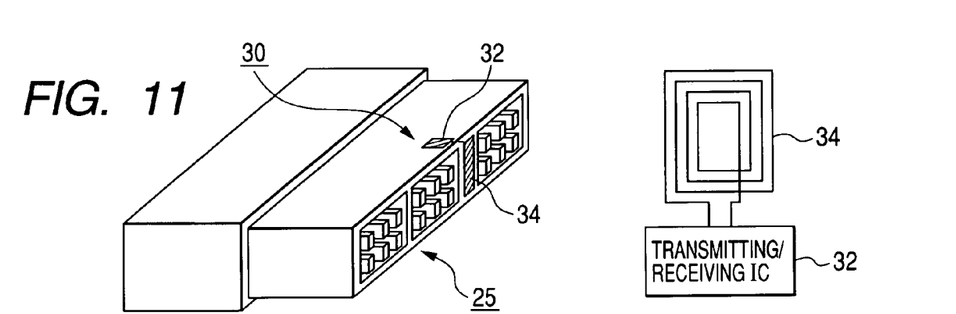

The rectangular coil of the coil antenna may be formed in the mating portion's front wall that is perpendicular to the longitudinal direction of the signal terminals 28 as shown in FIG. 11. Likewise, the antenna elements of the dipole antenna and the rectangular patch of the patch antenna may be formed in the front wall of the mating portion 26.

Figure 12:
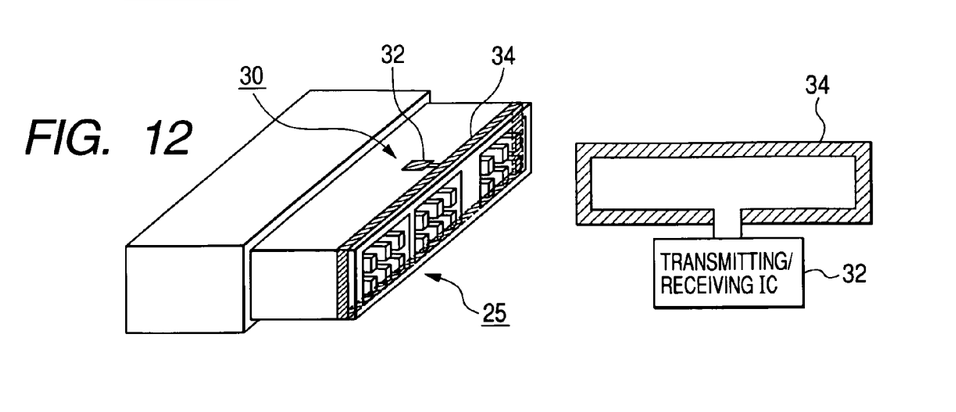

The antenna may be a loop antenna (or a coil antenna) as shown in FIG. 12 which is formed so as to make a circuit around the mating portion's side walls that are parallel to the longitudinal direction of the signal terminals 28 and surround the signal terminals 28.

Figure 13:
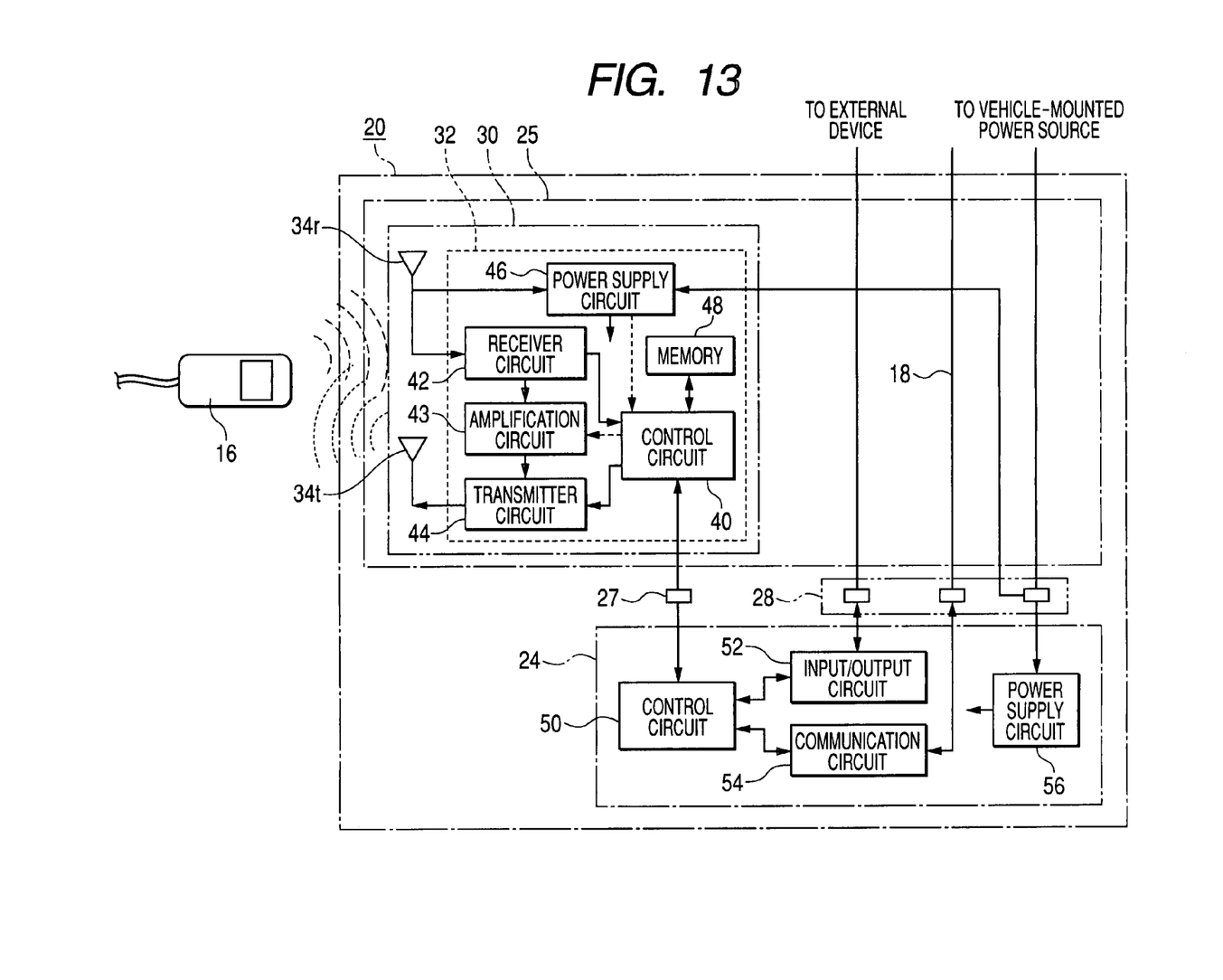
FIG. 13 is a block diagram showing another circuit structure of the ECU of the invention.

Although the RFID tag 30 has been described as having only one receiving/transmitting antenna (antenna 34) in this embodiment, it may have two antennas, one for signal transmission, one for signal reception. In this case, as shown in FIG. 13, the receiver circuit 42 is connected to a receiving antenna 34r, and the transmitter circuit 44 is connected to a transmitting antenna 34t.

In this embodiment, the power supply circuit 46 of the RFID tag 30 is supplied with electricity from the power supply circuit 56 on the ECU main body side for producing the power supply voltage for the circuit components of the RFID tag 30. However, it is possible to supply electricity to the power supply circuit 46 of the RFID tag 30 directly through the signal terminal 28 connected to the power wire leading to the vehicle installed power source as shown in FIG. 7.

When the power supply circuit 46 of the RFID tag 30 is supplied with electricity from the power supply circuit 56 on the ECU main body side (or through the power wire leading to the vehicle installed power source) to produce the power supply voltage, the RFID tag 30 can consume more electricity than when the power supply voltage is produced from the electric power received by the antenna 34 (or 34r).

Accordingly, the RFID tag 30 may be so configured that, when the power supply circuit 46 of the RFID tag 30 is supplied with electricity from the power supply circuit 56 on the ECU main body side (or through the power wire leading to the vehicle installed power source), an amplification circuit 43 amplifies a transmission request signal transmitted from an external device such as the RFID tag reader 16 and received by the receiver circuit 42, and supplies it to the transmitter circuit 44 as a carrier wave signal for use of producing a response signal to be transmitted through the transmitting antenna 34t.

With such a configuration, since the communication range between the RFID tag 30 and the RFID tag reader 16 can be made longer, it becomes unnecessary to bring the RFID tag reader 16 near the ECU 20 when reading the ID of the ECU 20, thereby improving the working efficiency.

The above explained preferred embodiments are exemplary of the invention of the present application which is described solely by the claims appended below. It should be understood that modifications of the preferred embodiments may be made as would occur to one of skill in the art.

What is claimed is:

1. An electronic unit having identification information thereon comprising:
   a casing;
   an electronic circuit contained in said casing;
   a connector fitted to said casing, said connector including signal terminals connected to said electronic circuit; and
   an RFID tag attached to said connector, wherein
   said RFID tag having identification information and configured to transmit a reply signal containing said identification information in response to a transmission request signal transmitted from outside and received by said RFID tag,
   said RFID tag has an antenna device and is configured to operate on power received by said antenna device for transmitting said reply signal when said RFID tag is not supplied with electricity from said electronic circuit,
   said RFID tag includes a read only memory (ROM) storing said identification information, and
   said electronic circuit is configured to read said identification information from said ROM in response to a notification request signal sent from outside through said signal terminals.

2. The electronic unit according to claim 1, wherein said RFID tag is configured to generate said reply signal by modulating a carrier wave signal received through said antenna device with said identification information stored in said ROM.

3. The electronic unit according to claim 1, wherein said connector includes connection terminals for connection between said electronic circuit and said RFID tag.

4. The electronic unit according to claim 3, wherein said RFID tag is supplied with electricity from said electronic circuit through said connection terminals.

5. The electronic unit according to claim 1, wherein said RFID tag is configured to amplify a carrier wave signal received through said antenna device and generate said reply signal by modulating said amplifier carrier wave signal with said identification information stored in said ROM when said RFID tag is supplied with electricity from said electronic circuit.

6. The electronic unit according to claim 1, wherein said connector has a mating portion housing said signal terminals, and said antenna device is located in said mating portion.

7. The electronic unit according to claim 6, wherein said antenna device is formed in one of side walls of said mating portion which are parallel to a longitudinal direction of said signal terminals.

8. The electronic unit according to claim 6, wherein said antenna device is formed in a front wall of said mating portion which is perpendicular to a longitudinal direction of said signal terminals.

9. The electronic unit according to claim 1, wherein said antenna device includes a receiving/transmitting antenna.

10. The electronic unit according to claim 1, wherein said antenna device includes a receiving antenna and a transmitting antenna.

11. The electronic unit according to claim 1, wherein said casing is made of a conductor and has a shape that totally encloses said electronic circuit except for an opening to which said connector is fitted.

12. The electronic unit according to claim 1, wherein said connector further includes a communication terminal for data communication between said electronic circuit and an external device, and a power terminal for supply of electricity to said electronic circuit.

13. The electronic unit according to claim 12, wherein said electronic circuit is configured to be connected to a network through said communication terminal.

* * * * *

UNITED STATES PATENT AND TRADEMARK OFFICE
CERTIFICATE OF CORRECTION

PATENT NO. : 7,259,679 B2  Page 1 of 1
APPLICATION NO. : 11/128280
DATED : August 21, 2007
INVENTOR(S) : Ichiro Yoshida and Hisashi Shigekusa

It is certified that error appears in the above-identified patent and that said Letters Patent is hereby corrected as shown below:

Title page

Correct Item (73), to read as Assignees:    DENSO CORPORATION, Kariya (JP)
DENSO WAVE INCORPORATED, Tokyo (JP)

Signed and Sealed this

Twenty-fourth Day of February, 2009

JOHN DOLL
*Acting Director of the United States Patent and Trademark Office*